United States Patent [19]

Ishikawa et al.

[11] Patent Number: 5,851,431
[45] Date of Patent: Dec. 22, 1998

[54] MICROEMULSION AND FIBER TREATMENT AGENT

[75] Inventors: Hiroki Ishikawa; Tsutomu Naganawa; Isao Ona, all of Chiba Prefecture, Japan

[73] Assignee: Dow Corning Toray Silicone Co., LTD., Tokyo, Japan

[21] Appl. No.: 846,401

[22] Filed: Apr. 30, 1997

[30] Foreign Application Priority Data

Apr. 30, 1996 [JP] Japan .................................. 8-134325

[51] Int. Cl.$^6$ ........................ B01J 13/00; D06M 13/513
[52] U.S. Cl. ................... 252/312; 106/287.14; 252/8.83
[58] Field of Search .................... 252/8.83, 312; 106/287.14, 170.2; 524/860, 226; 8/DIG. 1; 427/387

[56] References Cited

U.S. PATENT DOCUMENTS

| | | | |
|---|---|---|---|
| 4,105,567 | 8/1978 | Koerner et al. | 106/287.14 X |
| 4,366,001 | 12/1982 | Ona et al. | 106/287.14 X |
| 4,433,004 | 2/1984 | Marwitz et al. | 427/387 X |
| 4,501,619 | 2/1985 | Gee | 106/287.14 X |
| 4,625,010 | 11/1986 | Huhn et al. | 528/31 |
| 4,661,405 | 4/1987 | Greene et al. | 428/391 |
| 4,857,212 | 8/1989 | Ona et al. | 106/287.12 X |
| 4,900,362 | 2/1990 | Fujiki et al. | 106/287.14 |
| 5,063,260 | 11/1991 | Chen et al. | 524/860 X |
| 5,071,573 | 12/1991 | Coffindaffer et al. | 252/312 X |
| 5,196,054 | 3/1993 | Schmuck et al. | 106/287.14 X |
| 5,665,155 | 9/1997 | Höhner et al. | 106/287.14 |

Primary Examiner—Richard D. Lovering
Attorney, Agent, or Firm—Richard I. Gearhart; Sharon K. Severance

[57] ABSTRACT

The invention concerns a microemulsion having a mean particle size of 0.15 microns or less comprising:

(A) an organopolysiloxane having at least one epoxy containing group per molecule, wherein said epoxy containing group is selected from the group consisting of:

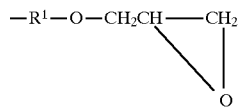

and

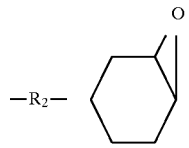

where
$R^1$ and $R^2$ are divalent hydrocarbon groups,
and wherein said organopolysiloxane also has carboxyl containing groups present in the amount of 0.5 to 15 moles of caboxyl containing groups per mole of silicon atoms in said organopolysiloxane, wherein said carboxyl containing groups are expressed by the formula:

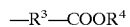

where
$R^3$ is a divalent hydrocarbon group, and
$R^4$ is selected from the group consisting of hydrogen atoms, monovalent hydrocarbon groups and silyl groups expressed by the formula —$SiR^5{}_3$, where $R^5$ indicates the same or different monovalent hydrocarbon groups; (B) a nonionic surfactant; and (C) water. The present invention also comprises a fiber treatment agent whose principal ingredient is the abovementioned microemulsion.

3 Claims, No Drawings

MICROEMULSION AND FIBER TREATMENT AGENT

FIELD OF THE INVENTION

The present invention concerns a microemulsion and a fiber treatment agent, and more specifically concerns a microemulsion of an organopolysiloxane which contains epoxy containing groups, and a fiber treatment agent whose principal ingredient is said microemulsion.

BACKGROUND OF THE INVENTION

Organopolysiloxanes which contain epoxy groups endow fibers with a superior hand in terms of softness and pliability, etc.; furthermore, such organopolysiloxanes do not cause any yellowing of fibers (such as that seen in the case of organopolysiloxanes containing amino groups). Accordingly, such organopolysiloxanes are widely used as fiber treatment agents. Furthermore, emulsion type fiber treatment agents formed by using water to emulsify such organopolysiloxanes containing epoxy groups are also known (see Japanese Patent Application Kokai No. 60-215874 and Japanese Patent Application Kokai No. 61-60726). However, emulsions formed by using common emulsifying devices such as homogenizers, colloid mills or line mixers, etc., to emulsify organopolysiloxanes containing epoxy groups suffer from the following drawbacks: namely, the mean particle size is large (ordinarily 0.3 microns or greater), and such emulsions lack sufficient mechanical stability and storage stability. Specifically, breakdown of the emulsion may occur during processes involving agitation, circulation or squeezing, etc., or during long-term storage of the emulsion, so that the organopolysiloxane and water are separated and float free. Furthermore, when such emulsions are applied to fibers, the free-floating organopolysiloxane remains on the fiber surfaces as oil droplets (oil spots), thus leading to problems of staining.

Meanwhile, fiber treatment agents consisting principally of microemulsions of organopolysiloxanes containing carboxyl groups are also known (see Japanese Patent Application Kokai No. 63-270875); however, such fiber treatment agents suffer from the drawback of insufficient hand of the fibers following treatment.

Specifically, the object of the present invention is to provide [1] a microemulsion of an organopolysiloxane which contains epoxy containing groups and carboxyl containing groups in the molecule, and [2] a fiber treatment agent whose principal ingredient is said microemulsion.

SUMMARY OF THE INVENTION

The present invention concerns a microemulsion having a mean particle size of 0.15 microns or less comprising:

(A) an organopolysiloxane having at least one epoxy containing group per molecule, wherein said epoxy containing group is selected from the group consisting of:

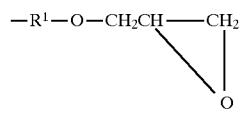

and

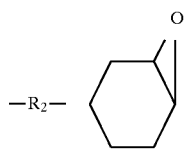

where
$R^1$ and $R^2$ are divalent hydrocarbon groups,
and wherein said organopolysiloxane also has carboxyl containing groups present in the amount of 0.5 to 15 moles of carboxyl containing groups per mole of silicon atoms in said organopolysiloxane, wherein said carboxyl containing groups are expressed by the formula:

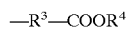

where
$R^3$ is a divalent hydrocarbon group, and
$R^4$ is selected from the group consisting of hydrogen atoms, monovalent hydrocarbon groups and silyl groups expressed by the formula $-SiR^5{}_3$, where $R^5$ indicates the same or different monovalent hydrocarbon groups;

(B) a nonionic surfactant; and (C) water.

The present invention also comprises a fiber treatment agent whose principal ingredient is the abovementioned microemulsion.

DETAILED DESCRIPTION OF THE INVENTION

In general, the present invention provides [1] microemulsion having a mean particle size of 0.15 microns or less comprising an organopolysiloxane having at least one epoxy containing group per molecule, wherein said epoxy containing group is selected from the group consisting of:

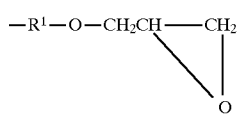

and

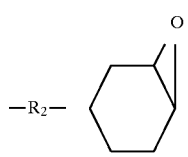

where
$R^1$ and $R^2$ are divalent hydrocarbon groups,
and wherein said organopolysiloxane also has carboxyl containing groups present in the amount of 0.5 to 15 moles of carboxyl containing groups per mole of silicon atoms in said organopolysiloxane, wherein said carboxyl containing groups are expressed by the formula:

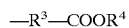

where
$R^3$ is a divalent hydrocarbon group, and
$R^4$ is selected from the group consisting of hydrogen atoms, monovalent hydrocarbon groups and silyl groups expressed by the formula —SiR$^5_3$, where R$^5$ indicates the same or different monovalent hydrocarbon groups(B) a nonionic surfactant; and (C) water. The present invention also comprises a fiber treatment agent whose principal ingredient is the abovementioned microemulsion.

The organopolysiloxane of component (A) is the principal ingredient of the microemulsion of the present invention; this organopolysiloxane contains epoxy containing groups expressed by the formula

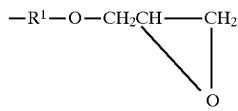

or epoxy containing groups expressed by the formula

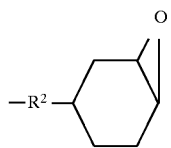

which are bonded to silicon atoms at the rate of at least one group per molecule, and carboxyl containing groups expressed by the formula —R$^3$—COOR$^4$ which are bonded to 0.5 mol % to 15 mol % of the silicon atoms in said organopolysiloxane. In the above formulae, R$^1$ and R$^2$ indicate divalent hydrocarbon groups; examples of such groups include alkylene groups such as ethylene groups, n-propylene groups, isopropylene groups and n-butylene groups, etc. Examples of such epoxy containing groups include a group expressed by the formula

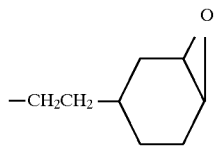

and a group expressed by the formula

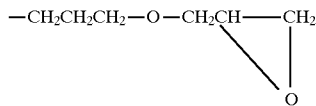

R$^3$ indicates a divalent hydrocarbon group. Examples of such groups include alkylene groups such as ethylene groups, n-propylene groups or n-butylene groups, and an alkylene-arylene group expressed by the formula —(CH$_2$)$_2$—C$_6$H$_4$—. R$^4$ indicates a group selected from hydrogen atoms, monovalent hydrocarbon groups and silyl groups expressed by the formula —SiR$^5_3$, where R$^5$ indicates monovalent hydrocarbon groups which may be of the same or different types. Examples of monovalent hydrocarbon groups which may occur as the abovementioned R$^4$ and R$^5$ include alkyl groups such as methyl groups, ethyl groups, propyl groups or octyl groups; substituted alkyl groups such as 2-phenylethyl groups, 2-phenylpropyl groups or 3,3,3-trifluoropropyl groups; and aryl groups or substituted aryl groups such as phenyl groups or tolyl groups. Among these groups, methyl groups or ethyl groups are especially desirable. Examples of such carboxyl containing groups include a group expressed by the formula —(CH$_2$)$_{10}$COOH, a group expressed by the formula —(CH$_2$)$_2$COOCH$_3$, a group expressed by the formula —(CH$_2$)$_{10}$COOSi(CH$_3$)$_3$ and a group expressed by the formula —CH$_2$CH(CH$_3$)COOCH$_3$. These carboxyl containing groups are groups that are necessary in order to form the organopolysiloxane of the present component into a microemulsion; furthermore, in cases where the microemulsion of the present invention is used as a fiber treatment agent, these groups undergo a crosslinking reaction with the abovementioned epoxy containing groups, thus forming a network structure at the surfaces of the fibers, so that drop-out caused by laundering is prevented. In order to obtain such an effect, it is necessary that the content of such carboxyl containing groups in the organopolysiloxane be in the range of 0.5 to 15 mol %. The reasons for this are as follows: i. e., if the abovementioned content is less than 0.5 mol %, it becomes difficult to form a microemulsion; on the other hand, if said content exceeds 15 mol %, the characteristic hand of an organopolysiloxane containing epoxy groups is lost. Furthermore, the abovementioned "mol %" is calculated using the following formula:

100×number of carboxyl containing groups bonded to silicon atoms/total number of silicon atoms Accordingly, in cases where the present component is an organopolysiloxane expressed by the formula

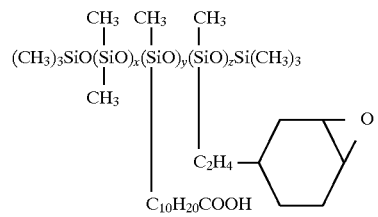

the "mol %" content of the carboxyl containing groups is calculated as 100×[y/(x+y+z+2)].

Examples of groups which may be bonded to the silicon atoms in the organopolysiloxane of the present component besides the abovementioned epoxy containing groups and carboxyl containing groups include monovalent hydrocarbon groups; e. g., alkyl groups such as methyl groups, ethyl groups, propyl groups and octyl groups; substituted alkyl groups such as 2-phenylethyl groups, 2-phenylpropyl groups and 3,3,3-trifluoropropyl-groups; and aryl groups or substituted aryl groups such as phenyl groups and tolyl groups. Among these groups, methyl groups are especially desirable. The molecular structure of this component may be linear, linear with some branching, cyclic or three-dimensional. In particular, a linear structure or a structure which is linear with some branching is especially desirable. In the case of a linear structure, organopolysiloxanes expressed by the general formula

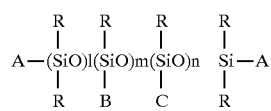

may be cited as examples. In the above formula, R indicates monovalent hydrocarbon groups of the types described above, B indicates the abovementioned epoxy containing groups, and C indicates the abovementioned carboxyl containing groups. A indicates groups selected from a set consisting of the abovementioned groups indicated by R, B and C, l is a positive number, m is 0 or a positive number, and n is 0 or a positive number. In cases where m or n is 0, A indicates epoxy containing groups or carboxyl containing groups. It is desirable that the value of (l+m+n) be in the range of 50 to 1,000. Furthermore, it is desirable that the viscosity at 25° C. be in the range of 10 to 1,000,000 centistokes, and a viscosity in the range of 100 to 10,000 centistokes is even more desirable.

The organopolysiloxanes expressed by the following formulae may be cited as examples of the present component:

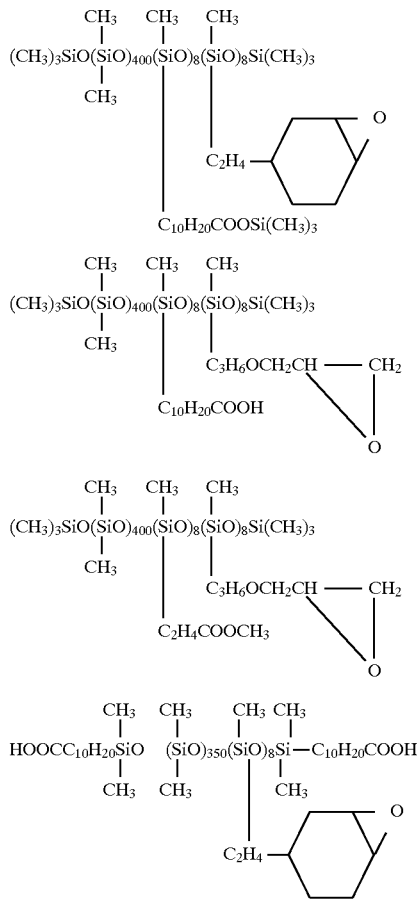

The organopolysiloxane of the present component can be manufactured as follows: e. g., by causing an epoxy compound containing an unsaturated bond expressed by the formula

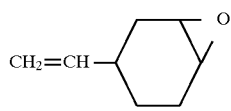

and a carboxyl compound containing an unsaturated bond (in which the carboxyl group is blocked by a trimethylsilyl group) expressed by the formula $CH_2=CH(CH_2)_8COOSi(CH_3)_3$ to simultaneously undergo an addition reaction at desired ratios with an organopolysiloxane which has hydrogen atoms bonded to silicon atoms in the side chains and which is expressed by the formula

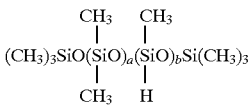

(in the above formula, a and b are positive numbers) using an addition reaction catalyst such as chloroplatinic acid, etc., at a concentration of 10 to 20 ppm, and then removing the trimethylsilyl groups by adding a small amount of alcohol or a small amount of a mixed solution of alcohol and water, it is possible to manufacture an organopolysiloxane expressed by the following formula (to which the abovementioned epoxy compound and carboxyl compound have been randomly added):

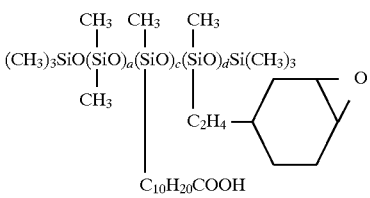

Where a is the same as described above, and c+d=b.

The following method may also be used: tetramethyldisiloxane expressed by the formula $H(CH_3)_2SiOSi(CH_3)_2H$, cyclic octamethyltetrasiloxane expressed by the formula $[(CH_3)_2SiO]_4$ and cyclic trimethyltrihydrodienetrisiloxane expressed by the formula $[CH_3HSiO]_3$ are mixed in desired proportions, and are then reacted using an equilibrium reaction type polymerization catalyst such as active clay, etc., thus synthesizing an organopolysiloxane which has hydrogen atoms bonded to silicon atoms in the side chains and at both ends, and which is expressed by the formula

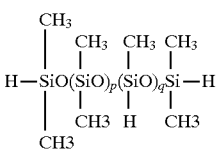

Where p and q are positive numbers. The aforementioned polymerization catalyst is then removed. Next, by causing an epoxy compound containing an unsaturated bond expressed by the formula

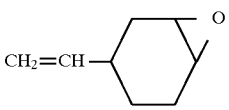

and a carboxyl compound containing an unsaturated bond (in which the carboxyl group is blocked by a trimethylsilyl group) expressed by the formula $CH_2=CH(CH_2)_{10}COOSi(CH_3)_3$ to simultaneously undergo an addition reaction at desired ratios with the abovementioned organopolysiloxane using an addition reaction catalyst, and then removing the trimethylsilyl groups by adding a small amount of alcohol or water, it is possible to manufacture an organopolysiloxane in which epoxy containing groups or carboxyl containing groups are randomly bonded to the side chains and ends of the molecule.

Furthermore, a carboxyl compound containing an unsaturated bond expressed by the formula $CH_2=CH(CH_2)_8COOSi(CH_3)_3$ is caused to undergo an addition reaction with tetramethyldisiloxane expressed by the formula H(CH$_3$)$_2$SiOSi(CH$_3$)$_2$H in the presence of an addition reaction catalyst, thus synthesizing a disiloxane expressed by the following formula:

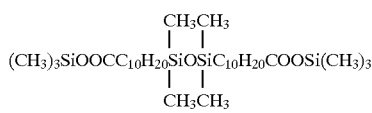

Next, after the catalyst is removed, cyclic octamethyltetrasiloxane expressed by the formula [(CH$_3$)$_2$SiO]$_4$ and cyclic trimethyltrihydrodienetrisiloxane expressed by the formula [CH$_3$HSiO]$_3$ are added and mixed in desired proportions, and this mixture is reacted to 7 to 10 hours at 40° to 60° C. using an equilibrium reaction type catalyst such as thoroughly dried active clay, etc., thus producing an organopolysiloxane which has hydrogen atoms bonded to silicon atoms in the side chains, and which can be expressed by the following formula:

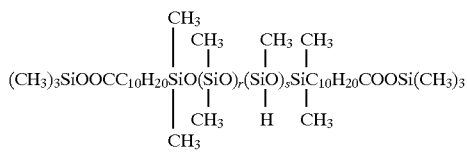

where r and s are positive numbers. Here, in cases where the groups expressed by the terminal formula —COOSi(CH$_3$)$_3$ have been converted into carboxyl groups expressed by the formula —COOH, it is necessary to silylate these groups using a silylating agent expressed by the formula ClSi (CH$_3$)$_3$. Next, the catalyst is filtered out, and an epoxy compound containing an unsaturated bond expressed by the formula

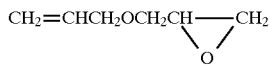

is caused to undergo an addition reaction with the abovementioned organopolysiloxane in the presence of a platinum catalyst used for addition reactions. Then, by adding alcohol or a mixture of alcohol with a small amount of water (as required) in order to remove the trimethylsilyl groups, it is possible to manufacture an organopolysiloxane which can be expressed by the following formula:

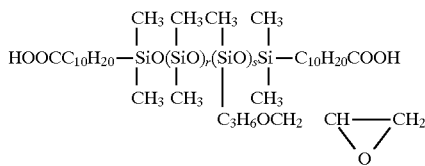

Where r and s are positive numbers.

Examples of compounds which can be used as the nonionic surfactant constituting component (B) of the microemulsion of the present invention include polyoxyalkylene alkyl ethers, polyoxyalkylene alkylphenyl ethers, polyoxyalkylene alkyl esters, polyoxyalkylene sorbitan alkyl esters, sorbitan alkyl esters, polyethylene glycols and polypropylene glycols. It is desirable that the amount of this component that is added be 15 to 60 parts by weight (preferably 20 to 40 parts by weight) per 100 parts by weight of the organopolysiloxane constituting component (A).

It is desirable that the amount of water constituting component (C) that is added to the microemulsion of the present invention be an amount which is such that the organopolysiloxane of component (A) constitutes 10 to 60 wt % of the emulsion of the present invention, and this amount of water is preferably an amount which is such that the organopolysiloxane of component (A) constitutes 20 to 50 wt % of the emulsion of the present invention.

The microemulsion of the present invention can be manufactured by uniformly mixing the abovementioned organopolysiloxane constituting component (A), nonionic surfactant constituting component (B) and water constituting component (C), and then emulsifying this mixture using an emulsifying device such as a homogenizer, colloid mill, line mixer, propeller mixer or vacuum emulsifier, etc. Furthermore, the mean particle size of this microemulsion is 0.15 microns or less.

The stability of the microemulsion of the present invention can be improved by adding a base such as sodium hydroxide, potassium hydroxide, sodium carbonate, potassium carbonate or an amine, etc., to said emulsion so that the pH is adjusted to a value of 6 to 8.

The microemulsion of the present invention described above has superior mechanical stability and storage stability. Furthermore, the microemulsion of the present invention is also advantageous in that said emulsion can also be emulsified merely by agitation, without using an ordinarily used emulsifying device. Moreover, this microemulsion is suitable for use as a fiber treatment agent.

In cases where the microemulsion of the present invention is used as a fiber treatment agent, various additives, e. g., alkylbenzenesulfonic acids such as octylbenzenesulfonic acid or dodecylbenzenesulfonic, etc., higher alcohol sulfuric acid esters, polyoxyethylene alkyl ether sulfuric acid esters; anionic surfactants such as sodium salts, potassium salts, lithium salts or ammonium salts, etc., of alkylnaphthylsulfonic acids; thickeners such as polyvinyl alcohols, carboxymethylcellulose or methylcellulose, etc.; resin finishing agents such as glyoxal resins, melamine resins, urea resins, polyester resins or acrylic resins, etc.. Other compounds such as organohydrodienepolysiloxanes, organoalkoxysilanes, preservatives and coloring agents, etc., may be added to said microemulsion if necessary. Furthermore, an aqueous solution of zinc borofluorate, sodium monohydrogenphosphate, sodium dihydrogenphosphate or sodium phosphate, etc., may be added as an epoxy group reaction catalyst. Moreover, in cases where the microemulsion of the present invention is further diluted with water prior to use, it is desirable that said microemulsion be diluted so that the concentration of the organopolysiloxane constituting component (A) is in the range of 0.01 to 10 wt %.

Methods which can be used to apply the fiber treatment agent of the present invention to fiber materials include spray application, roll application, painting with a brush, and immersion, etc. Following the application of the treatment agent, the treatment is completed by allowing the fiber material to stand at ordinary temperatures, blowing a hot air draft onto the fiber material or performing a heat treatment, etc. A method in which the fiber material to be treated is immersed in the fiber treatment agent of the present invention, after which the amount of application is controlled by means of wringing rollers, etc., and the fiber material is dried and then subjected to a heat treatment in a drier at 120° to 150° C., is especially common. The amount of application varies according to the type of fiber being treated; ordinarily, however, the amount of treatment agent applied is adjusted so that the amount of organopolysiloxane (constituting the aforementioned component (A)) that is applied is in the range of 0.01 to 10 wt % relative to the fiber material.

Examples of fiber materials which can be treated include natural fibers such as hair, wool, silk, flax, cotton, angora, mohair and asbestos; regenerated fibers such as rayon and bemberg; semi-synthetic fibers such as acetate fibers; synthetic fibers such as polyester-polyamide fibers, polyacrylonitrile fibers, polyvinyl chloride fibers, vinylon fibers, polyethylene fibers, polypropylene fibers and spandex fibers; and inorganic fibers such as glass fibers, carbon fibers and silicon carbide fibers. Examples of fiber forms which can be treated include staple fibers, filaments, tow, top fibers and yarns. Fabric types which can be treated include knitted fabrics, woven fabrics, nonwoven fabrics and paper type fabrics.

The abovementioned fiber treatment agent of the present invention can endow various types of fiber materials with a favorable hand; furthermore, the fiber treatment agent of the present invention is also advantageous in that said agent does not cause yellowing of the fiber materials following treatment.

PRACTICAL EXAMPLES

Next, the present invention will be described in detail in terms of practical examples of application. In the practical examples, all "parts" are parts by weight, and all viscosity values are values that were measured at 25° C.

Practical Example 1

4 parts of a nonionic surfactant expressed by the formula $C_{12}H_{25}O(CH_2CH_2O)_6H$ and 4 parts of a nonionic surfactant expressed by the formula $C_9H_{19}O(CH_2CH_2O)_{10}H$ were added to 30 parts of an organopolysiloxane with a viscosity of 4,430 centistokes expressed by the average unit formula

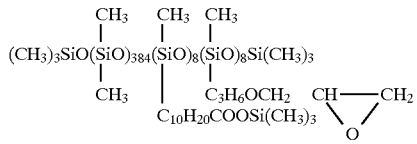

where the content of carboxyl containing groups 2 mol %, and the resulting mixture was uniformly mixed using a propeller type agitator. Next, 8 parts of water was added to this mixture, and the resulting mixture was agitated for 15 minutes. Following this agitation, 53.6 parts of water was added, and the resulting mixture was emulsified by agitation for an additional 30 minutes, thus producing a microemulsion. 0.4 parts of sodium carbonate was added to the microemulsion thus produced, so that the pH of said emulsion was adjusted to 8.0. This microemulsion was transparent with a slight milky color; the transmissivity of the emulsion measured at 580 nm was 63%. Furthermore, when the mean particle size was measured using a particle size measuring device (commercial name: SUB-MICRON PARTICLE ANALYZER Model N4MD, manufactured by Coulter Co., U.S.A.), a value of 0.06 microns was obtained.

The microemulsion thus obtained was stable, showing no separation even after being allowed to stand for 2 months at 25° C. Furthermore, this microemulsion was diluted with water to produce a dilute emulsion with a silicone concentration of 5 wt %. 300 ml of the dilute emulsion thus obtained was placed in a household mixer, and was treated for 60 minutes at a speed of 4000 rpm. The external appearance of the dilute emulsion following treatment was observed, and this appearance was taken as an indictor of the mechanical stability of the emulsion. The results obtained are shown in Table 1.

Practical Example 2

4 parts of a nonionic surfactant expressed by the formula $C_{12}H_{25}O(CH_2CH_2O)_6H$ and 4 parts of a nonionic surfactant expressed by the formula $C_9H_{19}O(CH_2CH_2O)_{10}H$ were added to 30 parts of an organopolysiloxane with a viscosity of 332 centistokes expressed by the average unit formula

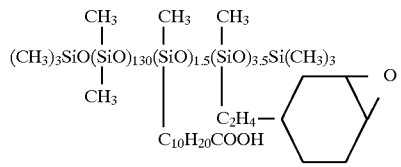

where the content of carboxyl containing groups was 1.1 mol %, and the resulting mixture was uniformly mixed using a propeller type agitator. Next, 8 parts of water was added to this mixture, and the resulting mixture was agitated for 15 minutes. Next, 53.8 parts of water was added, and the resulting mixture was emulsified by agitation for an additional 30 minutes, thus producing a microemulsion. 0.2 parts of sodium carbonate was added to the microemulsion thus produced, so that the pH of said emulsion was adjusted to 8.0. This microemulsion was transparent with a slight milky color. Furthermore, when the mean particle size was measured by the same method as in Practical Example 1, a value of 0.11 microns was obtained.

The microemulsion thus obtained was stable, showing no change in mean particle size even after being allowed to stand for 2 months at 25° C. Furthermore, the mechanical stability of this microemulsion was measured by the same method as in Practical Example 1. The results obtained are shown in Table.1.

Practical Example 3

6 parts of a nonionic surfactant expressed by the formula $C_{12}H_{25}O(CH_2CH_2O)_6H$ and 4 parts of a nonionic surfactant expressed by the formula $C_8H_{17}-C_6H_4-O(CH_2CH_2O)_{10}H$ were added to 30 parts of an organopolysiloxane with a viscosity of 1,670 centistokes expressed by the average unit formula.

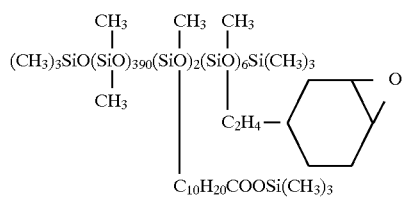

where the content of carboxyl containing groups was 0.5 mol %, and the resulting mixture was uniformly mixed using a propeller type agitator. Next, 10 parts of water was added to this mixture, and the resulting mixture was agitated for 15 minutes. Next, 49.9 parts of water was added, and the resulting mixture was emulsified by agitation for an additional 30 minutes, thus producing a microemulsion. 0.1 parts of sodium carbonate was added to the microemulsion thus produced, so that the pH of said emulsion was adjusted to 8.0. This microemulsion was transparent with a slight milky color. Furthermore, when the mean particle size was measured by the same method as in Practical Example 1, a value of 0.13 microns was obtained.

The microemulsion thus obtained was stable, showing no change in mean particle size even after being allowed to stand for 2 months at 25° C. Furthermore, the mechanical stability of this microemulsion was measured by the same method as in Practical Example 1. The results obtained are shown in Table 1.

Comparative Example 1

When an organopolysiloxane expressed by the average unit formula

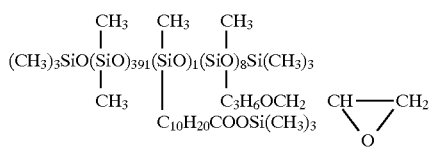

where the content of carboxyl containing groups was 0.25 mol % and an organopolysiloxane expressed by the average unit formula

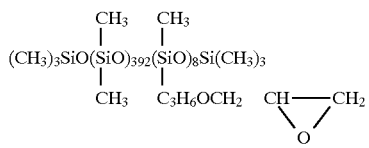

were agitated in the same manner as in Practical Example 1, neither organopolysiloxane could be emulsified; as a result, the organopolysiloxanes separated. Accordingly, neither the mean particle size nor the transmissivity could be measured.

Comparative Example 2

4 parts of a nonionic surfactant expressed by the formula $C_{12}H_{25}O(CH_2CH_2O)_6H$ and 4 parts of a nonionic surfactant expressed by the formula $C_9H_{19}O(CH_2CH_2O)_{10}H$ were added to 30 parts of an organopolysiloxane with a viscosity of 3,420 centistokes expressed by the average unit formula

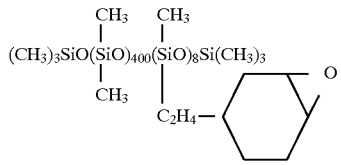

and the resulting mixture was uniformly mixed using a propeller type agitator. Next, 8 parts of water was added to this mixture, and the resulting mixture was uniformly agitated. Following this agitation, the mixture was passed through a colloid mill emulsifier; next, 53.6 parts of water was added, and an emulsion was obtained by uniform dissolution and dispersion. 0.4 parts of sodium carbonate was added to the emulsion thus produced, so that the pH of said emulsion was adjusted to 8.0. This microemulsion had a milky white color; the transmissivity of the emulsion measured at 580 nm was 0%. Furthermore, when the mean particle size was measured by the same method as in Practical Example 1, a value of 0.35 microns was obtained. Furthermore, the mechanical stability of the emulsion thus obtained was measured by the same method as in Practical Example 1. The results obtained are shown in Table 1.

Comparative Example 3

6 parts of a nonionic surfactant expressed by the formula $C_{12}H_{25}O(CH_2CH_2O)_6H$ and 4 parts of a nonionic surfactant expressed by the formula $C_9H_{19}O(CH_2CH_2O)_{10}H$ were added to 30 parts of an organopolysiloxane with a viscosity of 1,850 centistokes expressed by the average unit formula

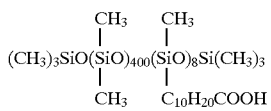

and the resulting mixture was uniformly mixed using a propeller type agitator. Next, 8 parts of water was added to this mixture, and the resulting mixture was agitated for 15 minutes. Next, 53.6 parts of water was added, and the resulting mixture was emulsified by agitation for an additional 30 minutes, thus producing a microemulsion. 0.4 parts of sodium carbonate was added to the microemulsion thus produced, so that the pH of said emulsion was adjusted to 8.0. This microemulsion was transparent with a slight milky color; the transmissivity of the emulsion measured at 580 nm was 65%. Furthermore, when the mean particle size was measured by the same method as in Practical Example 1, a value of 0.06 microns was obtained. Furthermore, the mechanical stability of the emulsion thus obtained was measured by the same method as in Practical Example 1. The results obtained are shown in Table 1.

Practical Example 4

Fiber treatment agents were prepared by diluting the emulsions prepared in Practical Examples 1 through 3 and Comparative Examples 2 and 3 with water so that the silicone concentration of each dilute emulsion was 0.1 wt %. 25 cm×25 cm samples of a 100% cotton knit fabric (commercial name: Inter Lock Knit, manufactured by Test Fabric Inc., U.S.A.) were immersed in the respective fiber treatment agents thus obtained. Next, these knit fabric samples were wrung out at a wringing rate of 100% by means of wringing rollers, and were dried by being allowed to stand overnight at 25° C. Following this drying, the samples were heat-treated for 3 minutes in a hot air draft drier at 150° C. The hand of the fabric samples thus treated was ascertained by touch. The results obtained are shown in Table 1. Furthermore, the results of an overall evaluation of these emulsions as fiber treatment agents are also shown in Table 1.

TABLE 1

| Type of Emulsion | Practical Example 1 | Practical Example 2 | Practical Example 3 | Comp. Ex. 2 | Comp. Ex. 3 |
| --- | --- | --- | --- | --- | --- |
| Mechanical stability | Adequate; no adhesion of oil to mixer vanes or glass walls seen | Adequate; no adhesion of oil to mixer vanes or glass walls seen | Adequate; no adhesion of oil to mixer vanes or glass walls seen | Inadequate; oil found adhering to mixer vanes and glass walls seen | Adequate; no adhesion of oil to mixer vanes or glass walls seen |

TABLE 1-continued

| Type of Emulsion | Practical Example 1 | Practical Example 2 | Practical Example 3 | Comp. Ex. 2 | Comp. Ex. 3 |
| --- | --- | --- | --- | --- | --- |
| Hand of knit | Extremely good | Extremely good | Extremely good | Good | Insufficient |
| Overall evaluation as a fiber treating agent | Extremely good | Extremely good | Extremely good | Insufficient | Insufficient |

The microemulsion of the present invention is a microemulsion with a mean particle diameter of 0.15 microns or less which consists of components (A) through (C) described above. As a result, the microemulsion of the present invention possesses the advantages of superior mechanical stability and superior storage stability. Furthermore, the fiber treatment agent of the present invention, whose principal ingredient is the abovementioned microemulsion, endows various types of fiber materials with a superior hand.

What we claim is:

1. A microemulsion having a mean particle size of 0.15 microns or less comprising:

(1) an organopolysiloxane having at least one epoxy containing group per molecule, wherein said epoxy containing group is selected from the group consisting of:

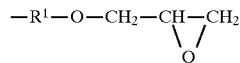

and

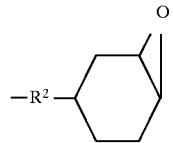

where
   $R^1$ and $R^2$ are divalent hydrocarbon groups,
   and wherein said organopolysiloxane also has carboxyl containing groups bonded to 0.5 to 15 mol % of silicon atoms in said organopolysiloxane, wherein said carboxyl containing groups are expressed by the formula

where
   $R^3$ is a divalent hydrocarbon group, and
   $R^4$ is selected from the group consisting of hydrogen atoms, monovalent hydrocarbon groups and silyl groups expressed by the formula $SiR^5{}_3$, where $R^5$ indicates the same or different monovalent hydrocarbon groups;

(2) a nonionic surfactant; and
   (3) water.

2. The microemulsion of claim 1, wherein the organopolysiloxane (1) has the formula:

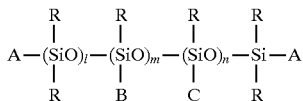

where R is a monovalent hydrocarbon group, B is an epoxy containing group, C is a carboxyl containing group, A is selected from the group consisting of R, B, and C, l is a positive number, m is 0 or a positive number, and n is 0 or a positive number, and with the proviso that when m is 0 at least one A per organopolysiloxane molecule is an epoxy containing group, and with the proviso that when n is 0, A is a carboxyl group bonded to 0.5 to 15 mole % of silicon atoms in the organopolysiloxane.

3. The microemulsion of claim 1, wherein the organopolysiloxane (1) is selected from the group consisting of:

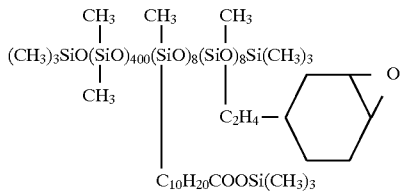

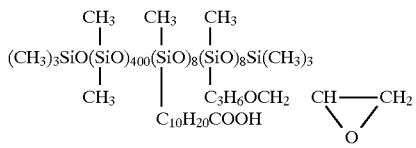

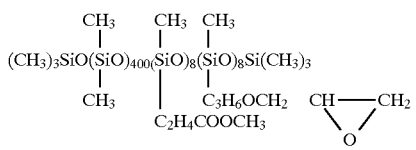

and

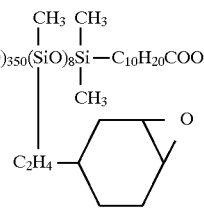

* * * * *